United States Patent [19]
Aldridge et al.

[11] 3,930,014
[45] Dec. 30, 1975

[54] PHARMACEUTICAL COMPOSITIONS
[75] Inventors: David Cecil Aldridge; Antony Borrow; Ernest Edward Lawrence Gerring, all of Macclesfield, England
[73] Assignee: Imperial Chemical Industries Limited, London, England
[22] Filed: Mar. 8, 1974
[21] Appl. No.: 449,555

[30] Foreign Application Priority Data
Mar. 29, 1973 United Kingdom............... 15154/73

[52] U.S. Cl. ................................................ 424/285
[51] Int. Cl.² ......................................... A61K 31/34
[58] Field of Search ..................................... 424/285

[56] References Cited
OTHER PUBLICATIONS
Tetrahedron Letters No. 6, pp. 727–730, (1968).

Primary Examiner—Frederick E. Waddell
Attorney, Agent, or Firm—Cushman, Darby & Cushman

[57] ABSTRACT

Pharmaceutical compositions containing the known compound dihydrocanadensolide; an improved process for the manufacture of dihydrocanadensolide; and a method of using dihydrocanadensolide in the treatment of ulcers in warm-blooded animals.

3 Claims, No Drawings

PHARMACEUTICAL COMPOSITIONS

This invention relates to new pharmaceutical compositions which possess ulcer-healing properties.

According to the invention there is provided a pharmaceutical composition which comprises as active ingredient the compound dihydrocanadensolide having the formula:

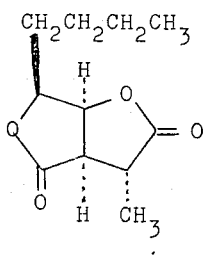

together with a pharmaceutically acceptable diluent or carrier.

The dihydrocanadensolide used as active ingredient in the composition of the invention may be obtained by fermentation of the organism *Penicillium canadense*, as dessribed by McCorkindale et alia, Tetrahedron Letters, (1968), 727.

The pharmaceutical composition of the invention may be obtained by conventional means using conventional diluents and carriers, and it may be in a form suitable for oral administration, for example in the form of a tablet, capsule, aqueous suspension, oily solution or suspension, emulsion, dispersible powder, granule, syrup or elixir; or for parenteral administration, for example in the form of a sterile injectable aqueous suspension or oily solution or suspension; or for rectal administration, as a suppository.

Compositions intended for oral use may be prepared according to any method known to the art for the manufacture of orally administrable pharmaceutical compositions, and such compositions may contain one or more agents selected from sweetening agents, for example sucrose, saccharin, glycerol or sorbitol; flavoring agents, for example essential oils; and coloring agents, in order to provide an elegant and palatable preparation.

The tablets of the invention may contain the active ingredient in admixture with non-toxic pharmaceutical excipients known to be suitable in the manufacture of tablets. Suitable pharmaceutical excipients are, for example, inert diluents, for example calcium carbonate, sodium carbonate, lactose, calcium phosphate or sodium phosphate; granulating and disintegrating agents, for example calcium carboxymethylcellulose, microcrystalline cellulose, maize starch or alginic acid; binding agents, for example starch, gelatin, polyvinylpyrrolidone or acacia mucilage; and lubricating agents, for example magnesium stearate, stearic acid or talc. The tablets may be uncoated or they may be coated by known techniques to increase stability or to mask unpalatable taste. They may also be formulated so as to delay disintegration and absorption in the gastro-intestinal tract and thereby provide a sustained action over a longer period.

Formulations for oral use may be presented as hard gelatin capsules containing active ingredient only or containing the active ingredient in admixture with an inert solid diluent, for example lactose, sorbitol, calcium carbonate, calcium phosphate or kaolin, or they may be presented as soft gelatin capsules wherein the active ingredient is mixed with an oily medium, for example arachis oil, liquid paraffin or olive oil.

The aqueous suspensions of the invention may contain the active ingredient in admixture with excipients known to be suitable in the manufacture of aqueous suspensions. Suitable excipients are, for example, suspending agents, for example sodium carboxymethylcellulose, methycellulose, hydroxypropylmethylcellulose, sodium alginate, polyvinylpyrrolidone, gum tragacanth, gum acacia or clays such as magnesium aluminum silicate; and dispersing or wetting agents, for example naturally occurring phosphatides, for example lecithin, or condensation products of ethylene oxide with fatty acids, for example polyoxyethylene stearate, or condensation products of ethylene oxide with long chain aliphatic alcohols, for example (heptadecaoxyethylene) cetanol, or condensation products of ethylene oxide with partial esters derived from fatty acids and a hexitorl, for example polyoxyethylene sorbitol mono-oleate, or condensation products of ethylene oxide with partial esters derived from fatty acids and hexitol anhydrides, for example polyoxyethylene sorbitan mono-oleate, or polyoxyethylene-polyoxypropylene block co-polymers.

Oily suspensions may be formulated by suspending the active ingredient in a vegetable oil, for example arachis oil, olive oil, sesame oil or coconut oil, or in a mineral oil, for example liquid paraffin, and the said oily suspensions may contain a thickening agent, for example beeswax, hard paraffin or cetyl alcohol. These compositions may also contain an anti-oxidant, for example propyl gallate or ascorbic acid.

The pharmaceutical composition of the invention may also be in the form of an oil-in-water emulsion in which the oily phase may be a vegetable oil, for example olive oil or arachis oil, or a mineral oil, for example liquid paraffin, or mixtures of these. Suitable emulsifying agents are naturally occurring gums, for example gum acacia or gum tragacanth, naturally occurring phosphatides, for example soya bean lecithin, or esters or partial esters derived from fatty acids and hexitol anhydrides, for example sorbitan mono-oleate, or condensation products of the said partial esters with ethylene oxide, for example polyoxyethylene sorbitan mono-oleate.

Dispersible powders and granules suitable for the extemporaneous preparation of an aqueous suspension by the addition of water may contain the active ingredient in admixture with a dispersing or wetting agent, suspending agent and one or more preservatives. Suitable dispersing or wetting agents and suspending agents are those mentioned above in the description of aqueous suspension formulations.

Syrups and elixirs may be formulated with sweetening agents, for example glycerol, sorbitol, saccharin sodium or sucrose. Such formulations may also contain a demulcent, a preservative and flavoring and coloring agents.

Compositions intended for parenteral administration may be sterilized by conventional methods, for example by heat treatment, or by filtration through a bacterial filter, or by treatment with a sterilising agent such as ethylene oxide.

The pharmaceutical composition of the invention may alternatively be in the form of a suppository intended for administration of the active ingredient per rectum. Such a composition may be prepared by mixing the active ingredient with a suitable non-irritating excipient which is solid at ordinary temperatures but liquid at the rectal temperature and which will therefore melt in the rectum to release the active ingredients. Suitable excipients are cocoa butter, polyethylene glycols and semi-synthetic glycerides.

As stated above, dihydrocanadensolide may be obtained by the fermentation of Penicillium canadense. The known fermentation process produces inter alia a mixture of approximately equal proportions of dihydrocanadensolide and canadensolide, which mixture is extremely difficult to separate into its components; and indeed plate chromatography is necessary to effect a separation. We have now found that under certain conditions the fermentation process may be carried out so that dihydrocanadensolide is produced substantially free from canadensolide, that is, containing not more than about 3 percent by weight of canadensolide.

According to a further feature of the invention there is provided a process for the manufacture of dihydrocanadensolide which comprises cultivating the strain of *Pencillium canadense* identified as No. 95493 of the Commonwealth Mycological Institute, Kew, England, in an aqueous nutrient medium until the proportion of canadensolide has fallen to not more than about 3 percent of the dihydrocanadensolide present in the medium, followed by isolation of the dihydrocanadensolide from the medium.

The fermentation will normally be carried out either under surface culture conditions for at least 18 days, or under stirred culture conditions for at least 70 hours.

The aqueous nutrient medium will contain a source of assimilable carbon, for example a polyhydric alcohol, for example glucose. The carbon source is generally present in the medium within the range of 0.1 to 30 percent by weight and preferably within the range of 2 to 8 percent by weight.

The nitrient medium will also contain a source of assimilable nitrogen which may be an inorganic source or an organic source. The nitrogen source may conveniently be provided in the form of, for example, a nitrate of an alkali metal or an alkaline earth metal, or an ammonium salt of an inorganic acid or an organic acid, for example sodium, potassium, calcium or ammonium nitrate or ammonium tartrate, ammonium sulphate or ammonium phosphate. The nitrogen source may be supplemented by a source of organic nitrogen, for example a yeast extract. The nitrogen source is generally present in the medium in an amount such that there is present between 0.001 percent and 1.0 percent, and preferably between 0.01 percent and 0.5 percent, of a elementary nitrogen in the medium.

The medium will also contain smaller quantities of essential elements such as phosphorus (for example as potassium dihydrogen phosphate or di-ammonium hydrogen phosphate), magnesium (for example as magnesium sulphate or magnesium carbonate), sulphur (for example as a sulphate) and potassium (for example as potassium chloride or potassium carbonate) and minute quantities of so-called trace elements such as iron, manganese, zinc, molybdenum or copper.

As suitable aqueous nitrient media there may be mentioned, for example, the media known as Raulin-Thom and Czapek-Dox media, and of these the former is preferred.

The cultivation of the organism may be carried out within the temperature range of 15° to 35°C., preferably at a temperature of about 25°C.

The desired dihydrocanadensolide is present in the culture filtrate and may be isolated by filtration of the culture medium followed by extraction of the culture filtrate with a water-immiscible organic solvent such as chloroform or ethyl acetate, thereby providing a solution of mixed products. The extract may be separated by conventional means into acidic and neutral fractions, and the dihydrocanadensolide is concentrated in the neutral fraction. Further separation and purification may be carried out by means of conventional solvent extraction and crystallization techniques.

As stated above the active ingredient dihydrocanadensolide possesses ulcer-healing properties. These may be demonstrated by administration of the compound to rats in which gastric ulceration has been induced by subcutaneous administration of betamethasone, in which test dihydrocanadensolide produces a greater percentage increase in healing than an equal dose of the known ulcer-healing drug carbenoxolone. Dihydrocanadensolide also reduces the ulceration produced in rats by oral administration of a known ulcerogen such as fenclozic acid, again producing a greater percentage increase in healing than carbenoxolone.

Furthermore, and unlike carbenoxolone, dihydrocanadensolide substantially reduces duodenal ulceration produced in rats by application of acetic acid to the duodenum. Carbenoxolone is ineffective in the treatment of such ulcers.

The pharmaceutical composition of the invention may contain, in addition to the dihydrocanadensolide active ingredient, one or more known drugs selected from antacids, for example sodium carbonate, magnesium oxide, magnesium hydroxide, magnesium trisilicate, calcium carbonate, aluminum hydroxide and basic aluminum carbonate; ion exchange resins, for example polyamine methylene resin; bulk-forming agents, for example sodium carbonxymethylcellulose; and sedatives and tranquillising agents, for example chlorpromazine, meprobamate and the benzodiazepine drugs, for example chlordiazepoxide and diazepam.

When used for healing ulcers in warm-blooded animals, including humans, it is expected that dihydrocanadensolide will be administered at a daily dose of between 5 to 100 mg. per kg. bodyweight, preferably between 10 and 20 mg. per kg. bodyweight, at doses spaced at about 4–5 hourly intervals. A preferable dosage regime in man is a dose of 150 to 200 mg. four times per day.

The invention is illustrated but not limited by the following Examples:

EXAMPLE 1

An aqueous nutrient medium is made up containing the following ingredients:

| | |
|---|---|
| D-Tartaric acid | 0.266% w/v |
| Mono-ammonium tartrate | 0.266% w/v |
| Di-ammonium hydrogen phosphate | 0.04% w/v |
| Potassium carbonate | 0.04% w/v |
| Magnesium carbonate [3MgCO$_3$, Mg(OH)$_2$, 3H$_2$O] | 0.027% w/v |
| Ammonium sulphate | 0.016% w/v |
| Zinc sulphate heptahydrate | 0.0042% w/v |
| Ferrous sulphate heptahydrate | 0.0042% w/v |
| Dextrose ("Cerelose" brand; "Cerelose" is a Registered Trade Mark) | 5.0% w/v |
| Yeast extract ("Oxoid" brand; | 0.1% w/v |

-continued

"Oxoid" is a Registered
Trade Mark)
Deionized water                           to 100% w/v This medium is placed in glass fermentation vessels (each one containing 1 liter of medium) and the medium is sterilized by autoclaving, the pH of the medium then being 5.6.

An agar slant of 45 ml. of nutrient medium is prepared comprising:

Potato extract (from 200 g. of peeled and chopped
potatoes boiled in 1 liter of deionized water
for 20 minutes, then strained)
Dextrose                    20 g.
Agar ("Oxoid" No. 3)        20 g.
Deionized water             to 1 liter and is sterilized by boiling for 20 minutes at 15 p.s.i. The slant is inoculated with *Penicillium canadense* C.M.I 95493 (previously maintained on an agar medium containing 2.0 percent w/v potato extract, 2.0 percent w/v carrot extract and 2.5 percent w/v "Oxoid" agar No. 3) and incubated at 25°C. for 10 days. The mycelium and spores from four such slants are rubbed off into sterile water (100 ml. per slant) and 2 ml. of the suspension thereby obtained is added to each of 90 fermentation vessels containing 1 liter of sterile nutrient medium as described above.

The fermentation is carried out at a temperature of 25°C. for 33 days. The medium is then filtered and the culture filtrate (78 liters), which has a pH of 7.2, is adjusted to pH 2.0 with aqueous 6N-hydrochloric acid and extracted twice with 15.5 liters of ethyl acetate each time. The extracts are combined, dried and evaporated to dryness and there is thus obtained a crude mixture of fermentation products (87.6 g.). The crude mixture is dissolved in 2 liters of ether, the solution is filtered and the filtrate is extracted quickly with ice-cold aqueous sodium hydrogen carbonate solution, the extract being discarded. The ethereal solution is washed with water, dried and evaporated to dryness. The residue (29.7 g.) is boiled with 6 liters of n-hexane and the mixture is filtered. The filtrate is evaporated to dryness and the solid residue (24.5 g.) is crystallized from ether. There is thus obtained dihydrocanadensolide (14.9 g.) which is shown by gas-liquid chromatographic analysis to contain 2.6 percent w/w of canadensolide.

EXAMPLE 2

The mycelium and spores from one agar slant, similar to that described in Example 1 except that incubation is carried out for 9 days instead of 10 days, are suspended in 100 ml. of sterile water. 100 Ml. of the aqueous nutrient medium described in Example 1 are placed in a 500 ml. vessel, inoculated with 10 ml. of the above mycelial suspension and shaken at 25°C. for 3 days. The resulting mixture is added to 5 liters of the aqueous nutrient medium described in Example 1, and the mixture is stirred at 710 revolutions per minute at a temperature of 25°C. for 42 hours whilst air is blown through the mixture at a rate of 2.5 liters per minute. 4 Liters of the resulting mixture are added to 80 liters of the aqueous nutrient medium described in Example 1, and the mixture is stirred at 210 revolutions per minute at a temperature of 25°C. for 187 hours whilst air is blown through the mixture at a rate of 40 liters per minute.

The medium is then filtered and the filtrate (58 liters), which has a pH of 7.1, is adjusted to pH 2 with aqueous 6N-hydrochloric acid and extracted successively with 16 liters and 10 liters of ethyl acetate. The combined extracts are dried and evaporated to dryness and the residue (54.25 g.) is dissolved in 2 liters of ether. The solution is filtered and the filtrate is freed from acidic material as described in Example 1. The neutral residue (26.9 g.) is redissolved in ether, and the solution is treated with charcoal and filtered and the filtrate is evaporated to dryness. The residue is crystallized from ether and there is thus obtained dihydrocanadensolide (18.45 g.) which is shown by gas-liquid chromatographic analysis to contain 3.1 percent w/w of canadensolide.

EXAMPLE 3

A mixture of 50 parts by weight of dihydrocanadensolide, 27 parts by weight of lactose, and 20 parts by weight of maize starch is thoroughly stirred, and a paste formed from 2 parts by weight of maize starch and 40 parts by weight of water is added and thoroughly mixed. The resulting mass is passed through a 16-mesh screen, dried at 60°C. to constant weight and then passed through a 20-mesh screen. 1 Part by weight of magnesium stearate is added to the granules thus obtained and the mixture is compressed into tablets by conventional means. There are thus obtained tablets each weighing 100 mg. and containing 50 mg. of active ingredient which are suitable for oral administration to man for therapeutic purposes.

EXAMPLE 4

The process described in Example 3 is repeated except that 200 parts by weight of dihydrocanadensolide, 120.5 parts by weight of lactose, 60 parts by weight of maize starch, a paste formed from 6 parts by weight of maize starch, and 120 parts by weight of water, and 3.5 parts by weight of magnesium stearate are used as ingredients. There are thus obtained tablets each weighing 400 mg. and containing 200 mg. of active ingredient which are suitable for oral administration to man for therapeutic purposes.

EXAMPLE 5

A mixture of 50 parts by weight of dihydrocanadensolide, 33 parts by weight of calcium phosphate, 10 parts by weight of microcrystalline cellulose and 4 parts by weight of calcium carboxymethylcellulose is thoroughly stirred and a paste formed from 2 parts by weight of polyvinylpyrrolidone and 40 parts by weight of water is added and thoroughly mixed. The resulting mass is passed through a 16-mesh screen, dried at 60°C. to constant weight and then passed through a 20-mesh screen. 1 Part by weight of magnesium stearate is added to the granules thus obtained and the mixture is compressed into tablets by conventional means. There are thus obtained tablets each weighing 100 mg. and containing 50 mg. of active ingredient which are suitable for oral administration to man for therapeutic purposes.

EXAMPLE 6

The process described in Example 5 is repeated except that 200 parts by weight of dihydrocanadensolide, 120 parts by weight of calcium phosphate, 40 parts by weight of microcrystalline cellulose, 20 parts by weight of calcium carboxymethylcellulose, a paste formed from 16 parts by weight of polyvinylpyrrolidone and 320 parts by weight of water, and 4 parts by weight of magnesium stearate used as ingredients. There are thus obtained tablets each weighing 400 mg. and containing 200 mg. of active ingredient which are suitable for oral administration to man for therapeutic purposes.

What we claim is:

1. A pharmaceutical composition for internal use in the treatment of gastric or duodenal ulcers which comprises as active ingredient an effective amount of the compound dihydrocanadensolide having the formula:

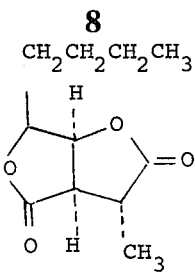

together with a pharmaceutically acceptable diluent or carrier.

2. The composition of claim 1 which is in tablet form suitable for oral administration.

3. A method for the treatment of gastric or duodenal ulcers in warm-blooded animals which comprises administering orally, parenterally or rectally to said animals an effective amount of dihydrocanadensolide.

* * * * *